United States Patent
Oshii et al.

(10) Patent No.: US 8,585,060 B2
(45) Date of Patent: Nov. 19, 2013

(54) TANDEM SEAL DEVICE

(75) Inventors: Yoji Oshii, Tokyo (JP); Koji Akiyama, Tokyo (JP); Joji Watanabe, Tokyo (JP); Atsushi Kaneko, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 659 days.

(21) Appl. No.: 12/743,602

(22) PCT Filed: Nov. 18, 2008

(86) PCT No.: PCT/JP2008/070946
§ 371 (c)(1),
(2), (4) Date: May 19, 2010

(87) PCT Pub. No.: WO2009/066664
PCT Pub. Date: May 28, 2009

(65) Prior Publication Data
US 2010/0270749 A1     Oct. 28, 2010

(30) Foreign Application Priority Data
Nov. 20, 2007   (JP) .................................. 2007-300363

(51) Int. Cl.
*F16J 15/34*   (2006.01)
(52) U.S. Cl.
USPC ........................................................ 277/401
(58) Field of Classification Search
None
See application file for complete search history.

(56) References Cited

U.S. PATENT DOCUMENTS

| | | | | |
|---|---|---|---|---|
| 6,145,843 A * | 11/2000 | Hwang | .......................... | 277/400 |
| 6,250,876 B1 * | 6/2001 | Høgholt | .......................... | 415/17 |
| 6,494,460 B2 * | 12/2002 | Uth | .............................. | 277/399 |
| 6,616,144 B2 * | 9/2003 | Theodore, Jr. | ................. | 277/358 |
| 7,726,659 B2 * | 6/2010 | Fujiwara et al. | ............. | 277/387 |
| 7,744,094 B2 * | 6/2010 | Yanagisawa et al. | ......... | 277/399 |
| 7,883,093 B2 * | 2/2011 | Ueda et al. | .................... | 277/371 |
| 2001/0010416 A1 * | 8/2001 | Wu et al. | ........................ | 277/387 |
| 2008/0111315 A1 * | 5/2008 | Fujiwara et al. | ............... | 277/377 |

FOREIGN PATENT DOCUMENTS

| | | | |
|---|---|---|---|
| CN | 101057093 A | 10/2007 | |
| EP | 1780450 A1 | 5/2007 | |
| JP | 2006017242 | 1/2006 | |
| JP | 2006022834 | 1/2006 | |
| JP | 2006083889 | 3/2006 | |
| JP | 2006083889 A * | 3/2006 | |
| WO | 2006040865 A1 | 4/2006 | |
| WO | WO 2006040865 A1 * | 4/2006 | ............... F16J 15/34 |

OTHER PUBLICATIONS

Parallel Chinese application Office Action dated May 22, 2012.

* cited by examiner

*Primary Examiner* — Vishal Patel
*Assistant Examiner* — L. Susmitha Koneru
(74) *Attorney, Agent, or Firm* — Harness, Dickey & Pierce, PLC

(57) ABSTRACT

A mechanical seal device for obtaining appropriate sliding properties under any conditions, such as a pressure of seal is low or high. Both first grooves 463 and second grooves 464 are formed on a sliding face 46 of a stationary ring 46. The first grooves which are not in communication externally and act for reducing contact resistance of a sliding face by a dynamic pressure action when a rotary shaft rotates, the second grooves act for reducing the contact resistance of the sliding face constantly by introducing a pressure from external. Thus, a mechanical seal device which is available to seal sealed fluid under an appropriate dry contact status wherein a sliding face load is reduced in any condition can be provided.

5 Claims, 4 Drawing Sheets

TANDEM SEAL DEVICE

FIELD

The present invention relates to a tandem seal device which is preferably used as, for example, a shaft seal device for an apparatus wherein sealing object is liquefied gas and the like, such as a pump to be used in, for example, a petrochemical plant.

BACKGROUND

A tandem seal device wherein mechanical seals are arranged as two stages in an axially same direction is effective to a high-pressure seal, because a pressure load at a sliding face can be reduced by dividing fluid pressure in the two stages. Further, even in case that leakage is occurred at a seal (a primary seal) of a sealed fluid side (an internal side), a seal of atmosphere side (a secondary seal) becomes backup so that fluid leakage can be prevented certainly by two sets of seals. Thus, the tandem seal device is used as a shaft seal device for an apparatus wherein sealing object is liquefied gas and the like, such as a pump used in, for example, a petroleum plant.

In the mechanical seal device used as a secondary seal device of the tandem seal device for such pump, particularly in the mechanical seal device used in dry contact condition in normal using condition, sliding property is very important.

Conventionally, in order to improve the sliding property of the mechanical seal device like this, for example, a sliding material wherein lubricant is immersion (for example, porous carbon, etc.) is used, or a method for making non-contact so as to act a levitation force between sliding faces by dynamic pressure generated by forming a groove on a sliding face of a sliding material are often applied. Further, it is suggested that a method for improving sliding property under dry contact condition so as to reducing load by lowering contact face pressure of sliding faces by introducing a primary seal side pressure via a through hole to whole circumferential groove formed on the sliding face (for example, refer to Japanese Patent Laid Open No. 2006-83889 (Patent Document 1) and Japanese Patent Laid Open No. 2006-83893 (Patent Document 2)).

Patent Document 1: Japanese Patent Laid Open No. 2006-83889

Patent Document 2: Japanese Patent Laid Open No. 2006-83893

SUMMARY

Problems to be solved by the Invention

However, in the mechanical seal device using a sliding material to which lubricant is immersion, there are problems that, when lower temperature usage wherein using temperature is relatively low, the viscosity becomes higher. Contrary this, oil leaks out when higher temperature usage wherein using temperature is relatively high. In addition, due to a possibility of reaction of oil and process liquid, there are problems that using condition thereof is limited and that application is limited.

Further, in a method for decreasing a load of sliding faces by a dynamic pressure of sliding due to forming groove on a sliding face of the sliding member, when a sliding speed is slow, a levitation force does not act on the sliding face sufficiently, there are problems for lowering performance by contact sliding or for leaking due to having a space in a normal operation.

Further, in a mechanical seal device having configuration wherein a pressure of primary seal side is introduced to a whole circumferential groove formed on a sliding face, in case that a high pressure is added to a primary seal, a levitation force becomes excessively larger, there is a possibility of an opening of sliding face, contrary this, when the pressure of primary seal is too low, there is a problem of rapidly abrasion due to excessive loading condition by loosing load reducing performance to the sliding face.

In this manner, in a conventional dry contact mechanical seal device, the sliding property receives effects when changing using temperatures, sliding speeds or a primary pressure and the like, it has been difficult to maintain an appropriate sliding property.

The present invention has been made by considering such problems, a purpose of the invention is to provide a mechanical seal device and a tandem seal device available to seal a sealing fluid in any conditions that low temperature usage and high temperature usage, faster or slower speeds of sliding faces, or a pressure of primary seal is high or low and the like, namely, under an appropriate dry contact condition wherein a load of sliding faces is reduced.

Means for Solving the Problems

In order to solve said problem, a mechanical seal device to seal a space between a housing and a rotary shaft extending through said housing, comprises a rotary ring rotatably arranged integrally with said rotary shaft and having a sliding face at one end portion of said rotary shaft in an axial direction, and a stationary ring placed on said housing, arranged as facing to said sliding face of said rotary ring and having a sliding face sliding with said sliding face of said rotary ring, wherein first grooves, which do not communicate with external portion of the mechanical seal device, are separately formed as concaves with each predetermined space in a circumferential direction, second grooves, which communicate with external portion of the mechanical seal device, and are available to introduce pressure from said external portion, are separately formed as concaves with each predetermined space in the circumferential direction, and said first grooves and said second grooves are formed respectively on any one or both of said sliding face of said rotary ring and said sliding face of said stationary ring.

According to the mechanical seal device of the present invention having such constitution, a mechanical seal device which is available to seal sealed fluid at an appropriate dry contact condition wherein a load of sliding faces is reduced in any condition, because the first grooves which do not communicate with external portion and act to reduce a contact resistance by a dynamic pressure action when a rotary shaft rotates, the second grooves which act to reduce a contact resistance of the sliding faces constantly by a static pressure action due to introducing a pressure from external portion. Namely, a mechanical seal device available to obtain an appropriate sliding property in any conditions that low temperature usage and high temperature usage, faster or slower speeds of sliding faces, or a pressure of primary seal is high or low and the like, and even these conditions are changed too.

Preferably, the mechanical seal device of the present invention wherein said second grove is in communicates with a higher pressure space which is sealed by said mechanical seal device.

According to the mechanical seal device of the present invention having such constitution can exert the above mentioned static pressure action at the second groove by communicating a higher pressure space and the second grooves.

Further preferably, the mechanical seal device of the present invention wherein said rotary ring or said stationary ring include a through hole which communicates with said higher pressure space and said second grooves.

According to the mechanical seal device of the present invention having such constitution can exert the above mentioned static pressure action at the second grooves by merely forming a through hole so as to communicate a higher pressure space and the second grooves.

Further preferably, the mechanical seal device of the present invention wherein said through hole is a bore having 3 mm or less diameter.

According to the mechanical seal device of the present invention having such constitution can prevent a surface opening and the like caused by excessive high pressure acting on the sliding face, even in case that a space of a high pressure side becomes excessively high pressure, because a pressure resistance is provided to the through hole by making small diameter of the through hole.

Further preferably, the mechanical seal device of the present invention wherein said through hole is provided with an orifice so as to control a pressure introduced into said second grooves.

According to the mechanical seal device of the present invention having such constitution can prevent surface opening and the like which is caused by acting excessive high pressure on the sliding face, even in case that a space of a high pressure side becomes excessively high pressure, because a pressure resistance is provided to the through hole by providing an orifice to the through hole.

Further preferably, the mechanical seal device of the present invention wherein both of said first grooves and said second grooves are formed on said sliding face of said stationary ring.

According to the mechanical seal device of the present invention having such constitution can provide a mechanical seal device having first grooves and second grooves with simple constitution as well as a pressure at high pressure space in a seal can be introduced stably to the second grooves.

Further preferably, the mechanical seal device of the present invention wherein a plurality of said first grooves are formed more than one or more of said second grooves.

According to the mechanical seal device of the present invention having such constitution can exert a dynamic pressure effectively by the first grooves with increasing number of grooves, since the dynamic pressure acts to the first grooves as dynamic pressure grooves when the rotary shaft rotates and strength thereof effects largely to numbers of concave and convex of circumferential direction of the sliding face, namely by increasing the number of the grooves.

Further preferably, the mechanical seal device of the present invention wherein each opening area of said second grooves on the sliding face are larger than that of said first grooves.

According to the mechanical seal device of the present invention having such constitution can exert a static pressure by the second grooves with increasing area thereof, since a pressure introduced to the second grooves as a static pressure grooves acts to the second grooves, and strength thereof effects largely to an active area, namely an opening area of the grooves.

Further preferably, a tandem seal device to seal a space between a housing and a rotary shaft extending through said housing comprising an axial direction two stage mechanical seal device including a primary mechanical seal device of internal side and a secondary mechanical seal device of an external side, wherein said secondary mechanical seal device is any one of above mentioned mechanical seal devices, and said second grooves communicate with an intermediate chamber between said primary mechanical seal device and said secondary mechanical seal device so as to introduce a pressure of said intermediate chamber to said second grooves.

According to the tandem seal of the present invention having such constitution can provide a tandem seal available to obtain an appropriate sliding property in any conditions that low temperature usage and high temperature usage, faster or slower speeds of sliding faces, or a pressure of primary seal is high or low and the like, even these conditions are changed too.

DETAILED DESCRIPTION

With respect to one embodiment of the present invention, it will be specified with reference to FIG. 1 to FIG. 3A.

In the present embodiment, the present invention will be specified by exemplifying a tandem seal used for a shaft seal device of a pump that sealing object is liquefied gas and the like.

Figure 1:
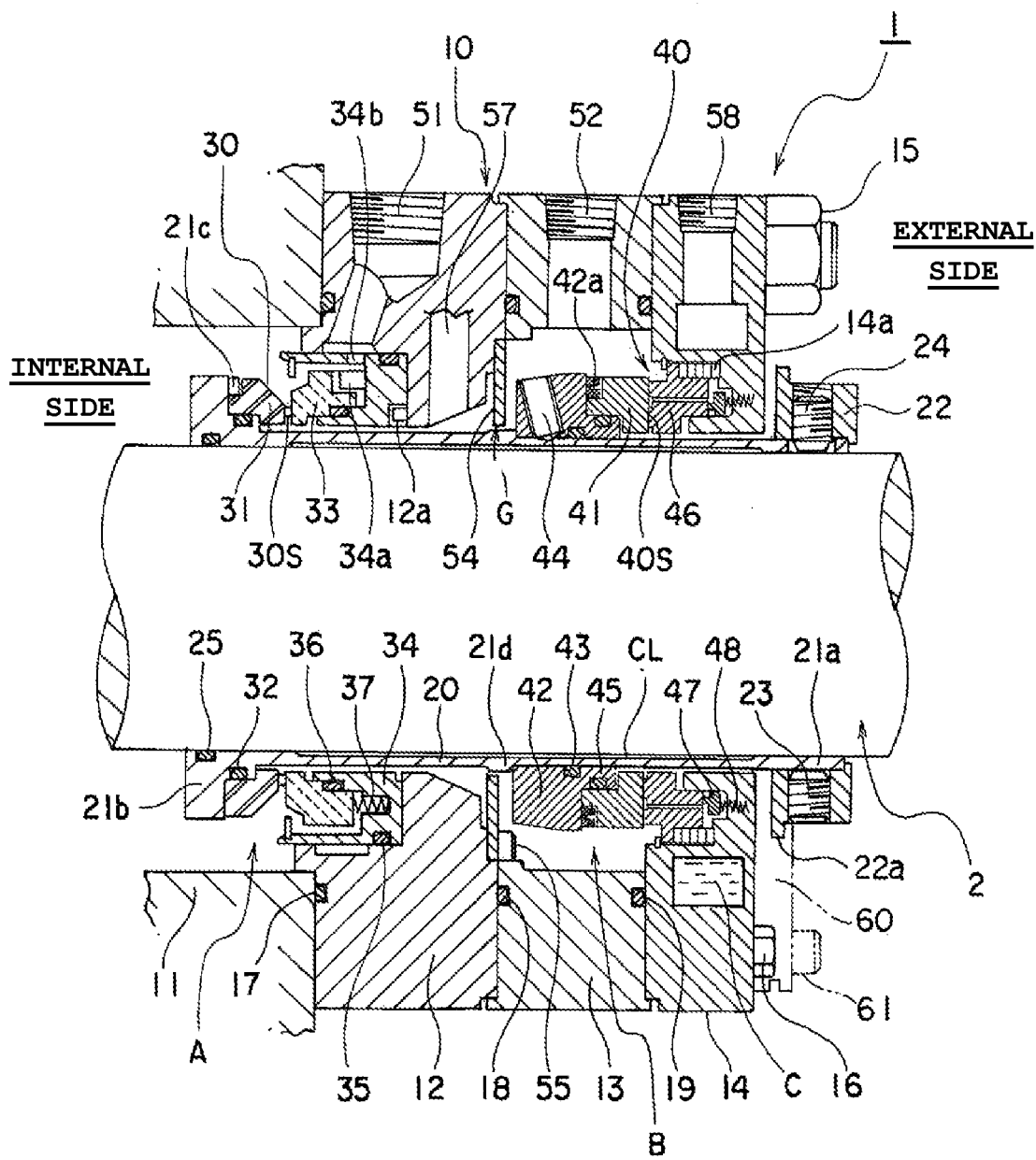
FIG. 1 is a cross sectional view cutout by a plane through a shaft center of a tandem seal to show a constitution of one embodiment of the tandem seal 1.

FIG. 1 is a cross sectional view cutout by a plane through a shaft center of a tandem seal 1 showing a constitution of the tandem seal 1.

The tandem seal 1 is provided between a shaft bore section 11 of a pump and a rotary shaft 2 which rotates a pump mechanism in the pump and to seal sealed fluid from a pump chamber. In the present embodiment, the rotary shaft 2 is arranged so that the shaft center thereof becomes substantially horizontal.

Note that, in FIG. 1, a left side of the drawing is the pump chamber side (internal side) wherein the sealed fluid exists, a right side is atmosphere side (external side).

As shown in FIG. 1, the tandem seal 1 comprises, as main constitutional parts, a shaft seal section housing 10, a shaft sleeve 20, a primary mechanical seal device 30 and a secondary mechanical seal device 40.

The shaft seal section housing 10 is provided so as to enclose an outer circumference of a shaft sealing position of the rotary shaft 2 and comprises seal covers 12 to 14. The seal covers 12 to 14 of the shaft seal section housing 10 are connected each other in an axial direction by screw members 15 and 16, and the seal covers are equipped at an external side of a shaft bore section 11 of the pump. Spaces between the shaft bore section 11 of the pump and the seal covers 12 to 14 are sealed tightly by O-rings 17 to 19, respectively.

The shaft sleeve 20 is inserted to a position where the primary mechanical seal device 30 and the secondary mechanical seal device 40 of the rotary shaft 2 are arranged, in other words, at a position corresponds to an inner circumferential side of the shaft seal section housing 10 of the rotary shaft 10.

The shaft sleeve 20 is fixed integrally with the rotary shaft 2 by a sleeve collar 22 located at an outer circumference of a tip end 21a of the external side, a set screw 23 to fix the sleeve collar to the external side tip end 21a and a set screw 24 to fix the sleeve collar 22 with the rotary shaft 2 with penetrating a securing bore provided at the external tip end 21a.

Further, a space between the shaft sleeve 20 and an outer circumferential face of the rotary shaft 2 is sealed tightly by an O-ring 25.

The two stages mechanical seal devices 30 and 40 to compose a main body of the tandem seal 1, namely, the primary mechanical seal device 30 at the internal side (sealed fluid side) and the secondary mechanical seal device 40 at the external side (atmosphere side) are equipped at a periaxial space between the shaft seal section housing 10 and the shaft sleeve 20.

The primary mechanical seal device 30 comprises a rotary ring 31, which is fixed to a tip end outer circumference of the internal side of the shaft sleeve 20, and rotates with the rotary shaft 2, and a stationary ring 33 arranged at an inner circumference of a seal cover 12 in the most internal side area of the shaft seal section housing 10, and does not rotate. The rotary ring 31 and the stationary ring 33 contact tightly at end faces which are facing each other by biasing force of a spring 37 in an axial direction to form sliding face 30S.

The rotary ring 31 is supported at a back face thereof by a flange portion 21b which is formed at an internal tip end of the shaft sleeve 20, sealed by an O-ring 32 to the shaft sleeve, and further engaged by a knock pin 21c to a circumferential direction with the shaft sleeve 20, so that the rotary ring 31 is rotated integrally with the rotary shaft 2.

An annular case 34 is fit at an inner circumferential concave section of the seal cover 12 via an O-ring 35, and is baffled by a knock pin 12a. The stationary ring 33 is movably supported towards the axial direction via an O-ring 36 to the annular case 34. The stationary ring 33 is baffled by a knock pin 34a, and is biased to the rotary ring 31 side by a plurality of springs 37 which are circumferentially arranged at the annular shape case 34.

Against the primary mechanical seal device 30 having such constitution, a part of transported fluid (sealed fluid) in an internal chamber of a pump is flowed to an outer circumferential space "A" of the primary mechanical seal device 30. The sealed fluid flowed to the outer circumferential space "A" is returned to the pump chamber through a liquid through port 34b which is provided at an outer circumferential section of the annular case 34 and through a flushing discharge port 51 provided on the seal cover 12, and thereby the flushing is performed. Namely, in the tandem seal 1 of the present embodiment, the sliding face 30S is lubricated by flowing a part of the sealed fluid via an outer circumferential of the rotary ring 31 and the stationary ring 33 of the primary mechanical seal device 30, and heat generated by sliding is effectively removed.

The secondary mechanical seal device 40 comprises a rotary ring 41 and a non-rotating stationary ring 46, in which the rotary ring 41 is provided at the inner circumference of a seal cover 13 at an intermediate of the shaft seal section housing 10 and fixed to the shaft sleeve 20 and rotates with the rotary shaft 2, and the stationary ring 46 is provided at an inner circumferential of the seal cover 14 which is the most external side of the shaft seal section housing 10. The rotary ring 41 and the stationary ring 46 tightly contact with facing end faces by an axial direction biasing force of the spring 48 so as to form a sliding face 40S.

Figure 2:
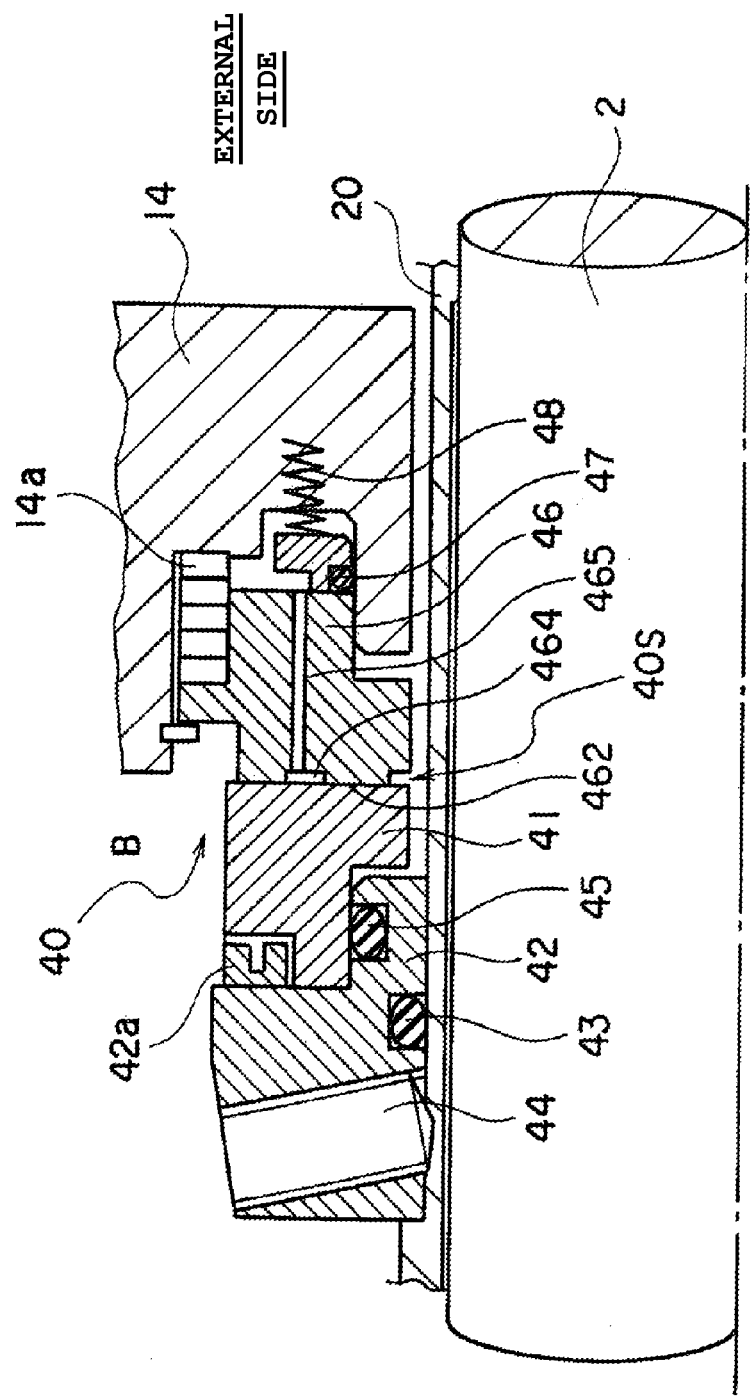
FIG. 2 is an enlarged view of neighbor of a secondary mechanical seal device of the tandem seal shown in FIG. 1.
Figure 3B:
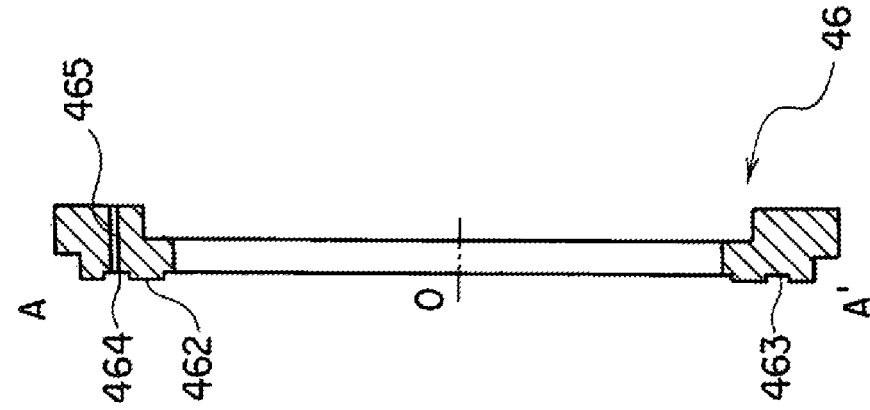
FIG. 3B is a cross sectional view along a line A-O-A' of FIG. 3A to show a constitution of the stationary ring of the secondary mechanical seal device shown in FIG. 2.
Figure 3A:
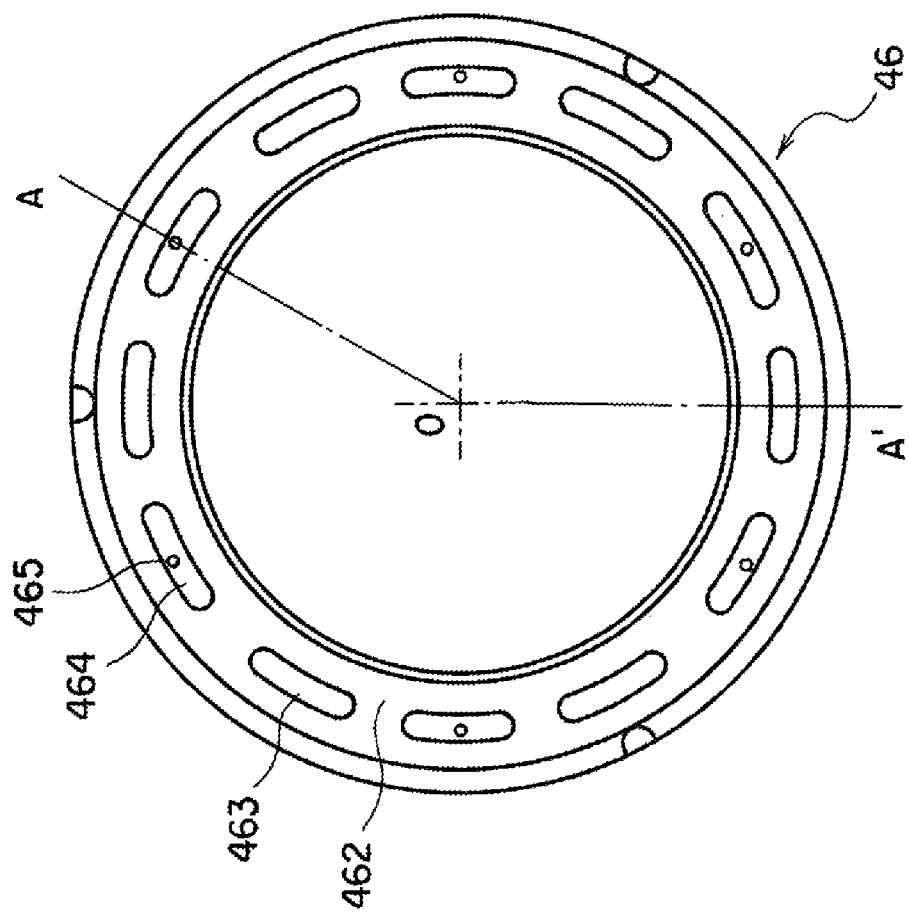
FIG. 3A is a plane view of a stationary ring of a secondary mechanical seal device to show a constitution of the stationary ring shown in FIG. 2.

With respect to the secondary mechanical seal device 40 according to the mechanical seal device of the present invention, this will be further specified precisely with reference to FIG. 2, FIG. 3A and FIG. 3B.

FIG. 2 is an enlarged view of neighbor of the secondary mechanical seal device 40 of the tandem seal 1 shown in FIG. 1, FIG. 3A and FIG. 3B show a constitution of a stationary ring 46 of the secondary mechanical seal device 40, FIG. 3A is a plane view of the stationary ring 46, FIG. 3B is a cross sectional view along a line A-O-A' of the FIG. 3A.

As shown in FIG. 1 and FIG. 2, the rotary ring 41 is supported via an O-ring 45 with a collar 42, which is inserted to a axial direction intermediate position of the shaft sleeve 20 via an O-ring 43 and is secured by a set screw 44. Further, the rotary ring 41 is engaged by a knock pin 42a to a circumferential direction to rotates with the rotary shaft 2 integrally.

The stationary ring 46 is fit to an inner circumferential concave portion of the seal cover 14 via an O-ring 47 movably in a axial direction and is baffled by a knock pin 14a, the stationary ring 46 is biased to the rotary ring 41 side by a plurality of springs 48 arranged to a circumferential direction on the seal cover 14.

As shown in FIG. 3A and FIG. 3B, a groove 463 and a groove 464 are formed on the sliding face 462 of the stationary ring 46, wherein the groove 463 is formed as a concave section merely (there is a case to call a first groove or a dynamic pressure groove), and the groove 464 has a fine bore 465 which penetrates to a back face of a sliding face 462 of the stationary ring 46 (there is a case to call a second groove or a static pressure groove). In other words, the first groove 463 is a groove which is not connecting with a back face of the stationary ring 46.

The fine bore 465 formed on the second groove 464 is a pipe having its diameter is 3 mm or less, and it penetrates between a bottom section of the second groove 464 formed at the sliding face 462 side of the stationary ring 46 and the back face of the stationary ring 46.

As shown in FIG. 1 and FIG. 2, in case that the stationary ring 46 is incorporated with the secondary mechanical seal device 40 of the tandem seal 1, an outer circumferential side of the sliding face 40S of the secondary mechanical seal device 40 becomes following mentioned an intermediate chamber "B" of the tandem seal 1, and an inner circumferential side of the sliding face 40S becomes an external side aerial space. And as illustrated, a back face side space of the stationary ring 46 communicates with the intermediate chamber "B". Note that, in normally, a pressure of the intermediate chamber "B" is higher pressure with respect to atmospheric pressure of the external side.

In the stationary ring 46 having such constitution, a pressure of the intermediate chamber "B" is introduced to the second groove 464 formed on the sliding face 462 side via the fine bore 465, and the pressure acts to reduce a contact load with the stationary ring 46 and the rotary ring 41. This status constantly acts, if the pressure of the intermediate chamber "B" is higher than the atmospheric pressure, regardless the rotary shaft 2 rotates or not. Therefore, the second groove 464 constantly acts as a static pressure groove to which the pressure of the intermediate chamber "B" acts so as to reduce the contact load.

On the other hand, the first groove 463 formed on the sliding face of the stationary ring 46, namely, the groove 463 is not communicating with the intermediate chamber "B" and the like which is a high pressure space (refer to FIG. 3A and FIG. 3B), when the rotary shaft 2 rotates, a dynamic pressure by a relative sliding of the sliding face 40 caused by a fluid which is infiltrated into the groove (in this embodiment, a following mentioned intermediate liquid "CL") acts to reduce a contact load of the stationary ring 46 and the rotary ring 41. Thus, the first groove 463 acts as a dynamic pressure groove for reducing the contact load when the rotary shaft 2 rotates.

Note that, lengths, widths, inner diameters (outer diameters), and number of the fine bores 465 to the one second groove 464 and the like of the first groove 463 and the second groove 464 are set as appropriate shapes according to a pressure and pressure change of the intermediate chamber "B", rotating speeds of the rotary shaft 2, required surface pressure of the sliding face 40S and wear performance and the like.

Returning to FIG. 1, in the tandem seal 1, the intermediate chamber "B" is formed over a range from an inner circumferential space of the sliding face 30S of the primary mechanical seal device 30 to an outer circumferential space of the sliding face 40S of the secondary mechanical seal device 40 by separating a shaft circumferential space between the shaft seal section housing 10 and the shaft sleeve 20 which is caused the primary mechanical seal device 30 and the secondary mechanical seal device 40.

In the tandem seal 1 of the present embodiment, an inert gas such as N2 gas and the like is supplied to the intermediate chamber "B" or the chamber is atmospheric status.

Further, in the tandem seal 1 of the present embodiment, a first gas bent line 52, which opens at an upper end portion of circumferential direction of the intermediate chamber "B", is formed on a seal cover 13 of the shaft seal section housing 10. The first gas bent line 52 is connected to a leak gas recovering section which is not shown.

Further, in the tandem seal 1, when the sealed fluid leaks from the primary mechanical seal device 30 to the intermediate chamber "B", the sealed fluid vaporizes due to a pressure of the intermediate chamber "B" which is lower than the internal pump chamber. The vaporized gas is prevented to leak externally by the secondary mechanical seal device 40, the gas (leaked gas) generated by the vaporization is discharged efficiently from the first gas bent like 52 which opens at the upper tip end position of the intermediate chamber "B".

Further, in the tandem seal 1 of the present embodiment, a partition plate 54 is provided between the primary mechanical seal device 30 and the secondary mechanical seal device 40 of the intermediate chamber "B", the partition plate 54 is secured with the seal cover at the shaft sealed section housing 10 by a bolt 55. An inner circumferential edge of the partition plate 54 faces adjacently to an outer circumferential face of the shaft sleeve 20 of the rotary shaft 2 via a fine space "G" of a diameter direction.

Further, a second gas bent line 57, which opens to the primary mechanical seal device 30 side with respect to the partition plate 54 of the intermediate chamber "B", is provided on the seal cover 12 of the shaft seal section housing 10. The second gas bent line 57 is connected with a leak gas recovering section which is not shown.

When N2 gas is supplied to the intermediate chamber "B", gas concentration of the intermediate chamber is reduced, and most part of the leaking gas is induced and discharged to the second gas bent line 57 which opens to the primary mechanical seal device 30 side, and is recovered to the leak gas recovering section not shown.

Therefore, this constitution is very effective in case the sealed fluid is high pressure and there is a risk for leaking it from the primary mechanical seal device 30.

Further, a cooling water jacket "C" continuing to a circumferential direction is formed at an inner circumferential section of the seal cover 14 of the shaft seal section housing 10 so that cooling water from outside can flow into the cooling water jacket "C" through a water bore 58. Note that, there is a case this cooling operation by the cooling water may be performed by considering high or low firing point of leakage gas, which is not necessity.

The cooling for the intermediate chamber "B" can be performed by flowing the cooling water to the cooling water jacket "C" from outside through the water bore 58 via an inner circumferential wall of the seal cover 14. As a result, heat generated by sliding of the sliding face 40S of the secondary mechanical seal device 40 can be removed efficiently.

Although the tandem seal 1 of the present embodiment comprises such constitution, the tandem seal 1 is equipped to the shaft bore section 11 of the pump by a setting jig 60.

A plurality of setting jigs 60 can be attached to an external end portion of the seal cover 14 of the shaft seal section housing 10 via a bolt 61, respectively. Further, an inner circumferential section thereof engages with an engaging protrusion 22a formed at an outer circumferential face of the sleeve collar 22 towards an axial direction.

When equipping the tandem seal 1, the inner circumferential section of the setting jig 60 is engaged with the engagement protrusion 22a of the sleeve collar 22, and the securing seal covers 12 to 14 are secured to the shaft seal section housing 10 by the bolt 61, thereby an axial direction relative position of the shaft sleeve 20 to the shaft seal section housing 10 is defined via the setting jig 60 and the sleeve collar 22.

Further, because the rotary ring 31 of the primary mechanical seal device 30 is secured to the flange section 21b of the shaft sleeve 20 and the rotary ring 41 of the secondary mechanical seal device 40 is secured to a step section 21d of the shaft sleeve 20 via the collar 42, axial direction installation positions of these rotary rings 31 and 41 are defined by that a relative position of the shaft sleeve 20 in an axial direction to the shaft seal section housing 10 is defined by the setting jig 60.

Further, according to the above, coil springs 37, 48 at back faces of the stationary ring 33, 46 of both mechanical seal devices 30 and 40, which are supported to the shaft seal section housing 10 side, are compressed to predetermined lengths in an axial direction, thereby predetermined contact loads are given to the sliding faces 30S, 40S of the both mechanical seal devices 30 and 40. After the tandem seal is assembled as a status shown in FIG. 1, the setting jig 60 is removed.

As described above, in the tandem seal 1 of the present embodiment, the second groove 464 communicating with the intermediate chamber "B" via fine bore 465, wherein the pressure of the intermediate chamber "B" is relatively high, and the first groove 463, wherein such communication bore is not formed, are arranged as mixing on the sealed face 462 of the stationary ring 46 of the secondary mechanical seal device 40. Further, a diameter of the fine bore 465 is formed with a fine diameter of 3 mm or less.

Therefore, when the pressure in the intermediate chamber "B" consequently becomes higher by pressure conditions of the internal side and the intermediate chamber "B" in the primary mechanical seal device 30 and the like, the pressure is introduced to the second groove 464 via the fine bore 465, the high pressure acts to the sliding face 40S between the rotary ring 41 and the stationary ring 46 via the second groove 464. As a result, the contact load of the sliding face 40S is lowered and becomes extremely lower face pressure contact sliding status, thus, a desirable dry operation status can be made.

On the other hand, even when the pressure of the intermediate chamber "B" becomes too high, the pressure loss is occurred to the effect of the intermediate chamber "B" at the second groove 464 via the fine bore 465, because the diameter of the fine bore 465 is limited to a predetermined small diameter. As a result, an excessive levitation force which acts on the sliding face 40S is reduced, face opening and excessive intermediate liquid leaking can be prevented.

Further, in case that the pressure of the intermediate chamber "B" is almost same level with atmospheric pressure, although the above mentioned load reducing effect of the sliding face by the second groove 464 cannot be obtained mostly, a dynamic pressure is generated when the rotary shaft rotates, because the first groove 463 which is not communicating with other space is formed on the sliding face 462 of the stationary ring 46, thereby the load of the sliding face is reduced. Thus, a preferable dry contact operation can be performed in this case.

Note that, such functions and effects cannot be obtained if a groove is formed over the whole circumference of the sliding face of the stationary ring 46, it can be achieved only when forming a groove which is defined as a predetermined length along the circumferential direction.

Further, in the tandem seal device 1 (or mechanical seal device), because the load of the sliding face is kept as lower status constantly, it is neither necessary a process for immersion of lubrication oil for the rotary ring 41 or the stationary ring 46, nor using such the lubricant oil immersion carbon and the like as sliding material. Thus, a simple and lower cost mechanical seal device and tandem seal can be provided.

Further, in the tandem seal 1 having such constitution, a mechanical seal device having arbitral sliding property can be provided by adjusting number, length, width, inner diameter (outer diameter) of the groove which is formed on the sliding face 462, number of fine bore 265 to the one second groove 464, pressure resistance of the fine bore 465 and the like. For example, a demand for preventing sliding face opening whenever possible until becoming high pressure, a demand for realizing particularly lower facing pressure even when a circumferential speed is faster and the like, a mechanical seal device having desired property constituted by adjusting properties sufficiently against various of demands required to applied apparatuses. Therefore, a tandem seal device having extremely high applicability, further can be provided.

Note that, the above mentioned embodiments are described for easily understanding the present invention, and the present invention is not limited at all. Respective elements disclosed in the present embodiment include whole design around and equivalent matters belonging into a technical scope of the present invention, and any arbitrary preferable various modifications are available.

For example, in the above mentioned stationary ring 46 of the secondary mechanical seal device 40 of the tandem seal 1, it is constituted that the pressure of the intermediate chamber "B" does not directly act to the second groove 464 by keeping pressure resistance to the fine bore 465 by limiting the diameter of the fine bore 465 as a small diameter. However, a method of keeping pressure resistance to the fine bore 465 or the second groove 464 may be other methods.

For example, it may be that an orifice is equipped to an arbitral position of the fine bore 465, thereby to prevent directly acting the pressure of the intermediate chamber "B" to the second groove 464 even when the pressure of the intermediate chamber "B" becomes too high so as to prevent an excessive levitation force acts to the sliding force 40C.

Further, shapes, arrangements and the like of the first groove formed on the sliding face 462 and the second groove 464 are arbitral.

Figure 4B:
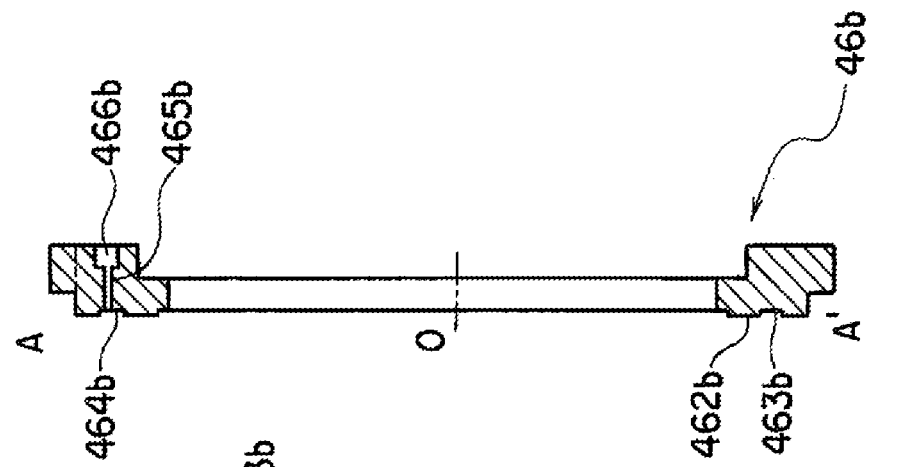
FIG. 4B is a cross sectional view along a line A-O-A' of FIG. 4A to show another example of the stationary ring of the secondary mechanical seal device shown in FIG. 2.
Figure 4A:
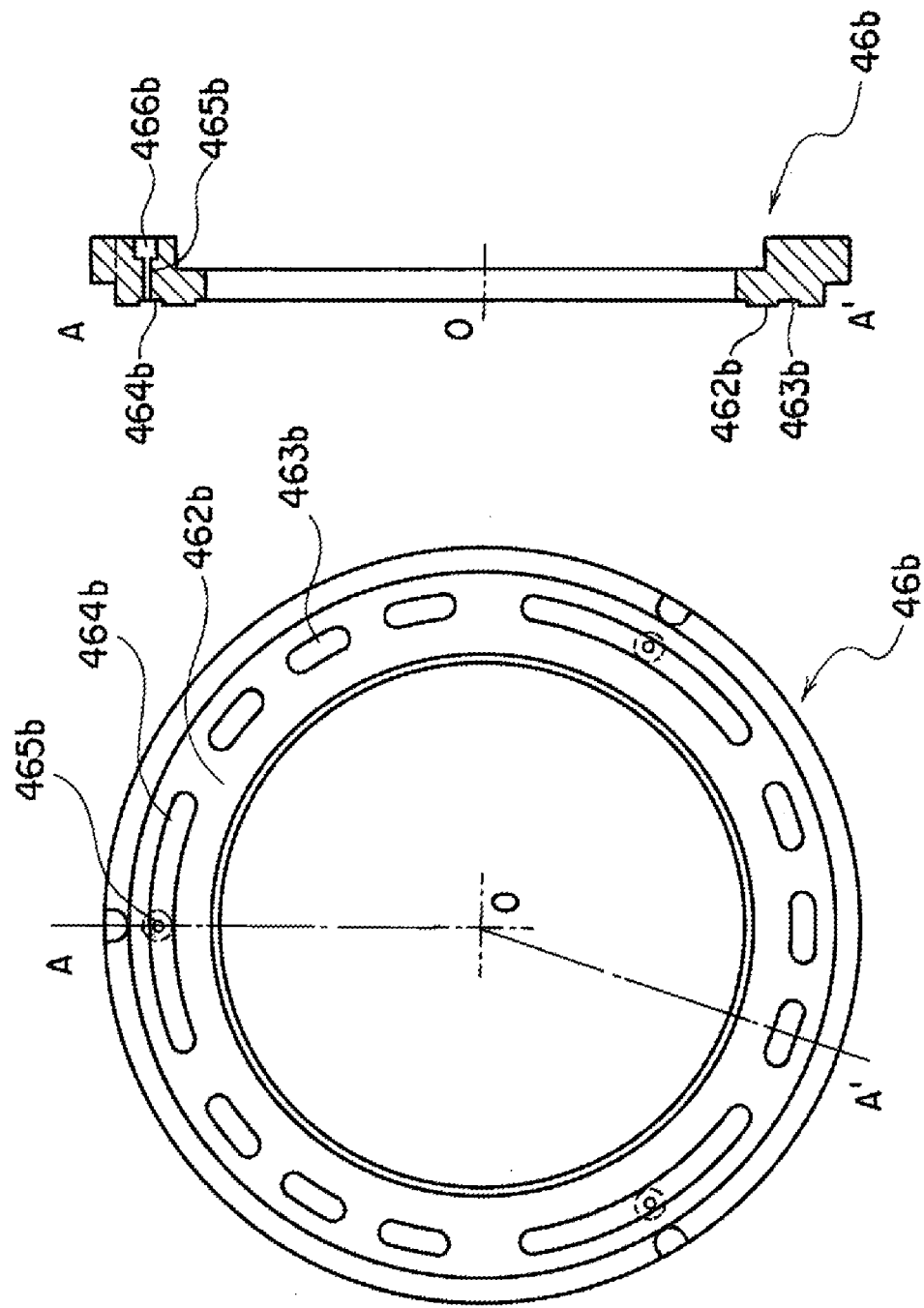
FIG. 4A is a plane view of a stationary ring to shown another example of the stationary ring of the secondary mechanical seal device shown in FIG. 2.

As one example of such modification, FIG. 4A and FIG. 4B shows a stationary ring 46*b* having different constitution from the stationary ring 46 shown in FIG. 3A and FIG. 3B.

FIG. 4A and FIG. 4B shows another example (46*b*) of the stationary ring of the secondary mechanical seal device 40, FIG. 4A is a plane view of the stationary ring 46*b*, FIG. 4B is a cross sectional view along a line A-O-A' of FIG. 4B.

In the stationary ring 46*b* shown in FIG. 4A and FIG. 4B, a first groove 463*b* formed as mere concave portion and a second groove 464*b* in which a fine bore 465*b* which penetrates to a back face are formed on a sliding face 462*b* too. However, a circumferential direction length, number and location of these first groove 463*b* and second groove 464*b* are different from the stationary ring 46 shown in FIG. 3A and FIG. 3B.

Comparing from the stationary ring 46 shown in FIG. 3A and FIG. 3B, with respect to the first groove 463*b*, a circumferential direction length is shortened and number thereof are increased, with respect to the second groove 464*b*, a circumferential direction length is elongated and the number thereof are decreased.

In the first groove 463 as a dynamic pressure groove, the dynamic pressure occurs when the rotary shaft 2 rotates, the pressure strength effects considerably to concave and convex of the circumferential direction, namely, effects to the number of grooves. On the other hand, the second groove 464*b* as a static pressure groove, since it causes to act a pressure introduced from the intermediate chamber "B" to a sliding face 462*b*, the strength of the pressure effects considerably to an active area, namely effects to an opening area of the groove. Thus, in order to exert performances of the first groove 463*b* as a dynamic pressure groove and the second groove 464*b* as a static pressure groove effectively, for example, it is preferable to constitute the stationary ring 46*b* as shown in FIG. 4A and FIG. 4B.

Further, in the stationary ring 46*b* shown in FIG. 4A and FIG. 4B, an enlarged diameter portion 466*b* is formed at a tip end of a back face side of a fine bore 465*b*. This enlarged diameter portion 466*b* is constituted for providing an orifice. As mentioned above, when controlling the pressure resistance of the fine bore 465*b* by the orifice and the like, it is preferable, for example, to provide a member therefor to such enlarged diameter portion 466*b*.

Further, in the abovementioned embodiment, any of the first groove 463 as a dynamic pressure groove and second groove 464 as a static pressure groove 464 are formed on the sliding face 462 of the stationary ring 46.

Further, in the above mentioned embodiment, it has been constituted that the second groove 464 communicates with the intermediate chamber of the tandem seal 1 via the fine bore 465 to introduce the pressure of the intermediate chamber to the second groove 464.

Further, in the above mentioned embodiment, it was an example wherein a mechanical seal device according to the present invention is applied to the secondary mechanical seal device 40 of the tandem seal 1.

INDUSTRIAL APPLICABILITY

The present invention can be used to a pump, an air blower, a stirrer and the like used to a petrochemical plant, etc.

The invention claimed is:

1. A tandem seal device arranged between a housing and a rotary shaft extending through said housing to prevent leaking of a sealing fluid from an internal side to an aerial space on an external side by an axial direction two stage mechanical seal device including a primary mechanical seal device of the internal side with higher pressure and a secondary mechanical seal device of an external side with lower pressure, wherein:

said preliminary mechanical seal device comprises a rotary ring, which is arranged on the internal side and rotates with said rotary shaft, and a stationary ring, which is arranged on the external side and does not rotate, said rotary ring and said stationary ring contacting tightly at end faces which are facing each other by biasing force of a spring in an axial direction to form a sliding face, said secondary mechanical seal device comprises a rotary ring, which is arranged on said primary mechanical seal device side and rotates with said rotary shaft, and a stationary ring, which is arranged on the external side and does not rotate, said rotary ring and said stationary ring contacting tightly at end faces which are facing each other by biasing force of a spring in the axial direction to form a sliding face, an inner circumferential side of said sliding face of said secondary mechanical seal device is said aerial space on the external side, and an intermediate chamber, a pressure thereof is higher than said aerial space on the external side, is formed over a range from an inner circumferential space of said sliding face of said primary mechanical seal device to an outer circumferential space of said sliding face of said secondary mechanical seal device, first grooves and second grooves are formed respectively on said sliding face of said stationary ring of said secondary mechanical seal device, said first grooves, which do not have a through hole and do not communicate with other space including said intermediate chamber, being separately formed as concaves with each predetermined space in a circumferential direction, said second grooves, which have a through hole and communicate with said intermediate chamber and are available to introduce pressure from said intermediate chamber, being separately formed as concaves with each predetermined space in the circumferential direction, and when said rotary shaft rotates and said sliding faces relatively slide, a dynamic pressure caused by a fluid infiltrated into said first grooves acts to said sliding faces so as to reduce a contact load of said stationary ring and said rotary ring, and a pressure introduced from said intermediate chamber to the second grooves acts to said sliding faces so as to reduce a contact load of said stationary ring and said rotary ring.

2. The tandem seal device as set forth in claim 1 wherein said stationary ring, in which said second grooves are formed, includes said through hole which is in communication with said intermediate chamber and said second grooves.

3. The tandem seal device as set forth in claim 2 wherein said through hole is a bore having 3 mm or less diameter.

4. The tandem seal device as set forth in claim 2 wherein said through hole is provided with an orifice for controlling a pressure induced into said second grooves.

5. The tandem seal device as set forth in claim 1 wherein a plurality of said first grooves are formed more than one or more of said second grooves.

* * * * *